United States Patent Office 3,447,473
Patented June 3, 1969

3,447,473
PUMPS AND REVERSIBLE PUMP TURBINES
Derek Hartland and Walter Frederic Hartles, Rugby, England, assginors to The English Electric Company Limited, Strand, London, England, a company of Great Britain
Filed June 19, 1967, Ser. No. 646,849
Claims priority, application Great Britain, June 17, 1966, 27,294/66
Int. Cl. F04d *13/04;* F04b *13/02*
U.S. Cl. 103—87          11 Claims

ABSTRACT OF THE DISCLOSURE

This invention is concerned with a starter motor arrangement for a pump or reversible pump turbine. A starter motor is needed in order to run the main machine up to synchronous speed in pumping direction at which it can be driven by an electric motor. According to this invention the starter motor is in the form of an hydraulic turbine having a runner surrounding the draft tube of the main machine and discharging into the draft tube. The runner is movable axially so that it can be disengaged from the runner of the main machine after the main machine has reached synchronous speed, so that the starter motor can remain stationary during normal operation and does not absorb power so as to reduce the efficiency of pumping.

---

This invention is concerned primarily with reversible pump turbines for hydro-electric power generation, but it is also applicable to pumps. A pump turbine is commonly coupled to an electrical machine which acts alternately as a motor and as a generator, and to a separate starter motor. The starter motor is used to run the pump turbine up to synchronous speed in the pumping direction in preparation for connecting the electrical machine into the electrical power grid so that it can run as a synchronous motor to drive the pump turbine in the pumping direction.

According to this invention the starter motor is in the form of an hydraulic turbine arranged co-axially with the runner of the pump turbine (which will be referred to as the "main runner") around the draft tube of the pump turbine (that is to say, the tube through which the main pump turbine discharges water when acting as a turbine and through which it draws in water when acting as a pump) to discharge inwards into the draft tube, the runner of the starter turbine being movable axially between a position in which a clutch couples it to the main runner, and a position in which it is disengaged from the main runner so that it can remain stationary while the main runner is operating with a pumping action at synchronous speed.

This invention is particularly applicable to a pump turbine with a vertical axis of rotation. In this case this invention lends itself to a convenient construction which is particularly compact vertically.

Although this invention can in principle be applied to pump turbines of various sizes, it is of particular use for larger pump turbines having outputs of the order of 100,000 horsepower and higher, and particularly above 300,000 horsepower.

An example of a pump turbine according to this invention is shown in the accompanying drawings. In these drawings.

Figure 1:
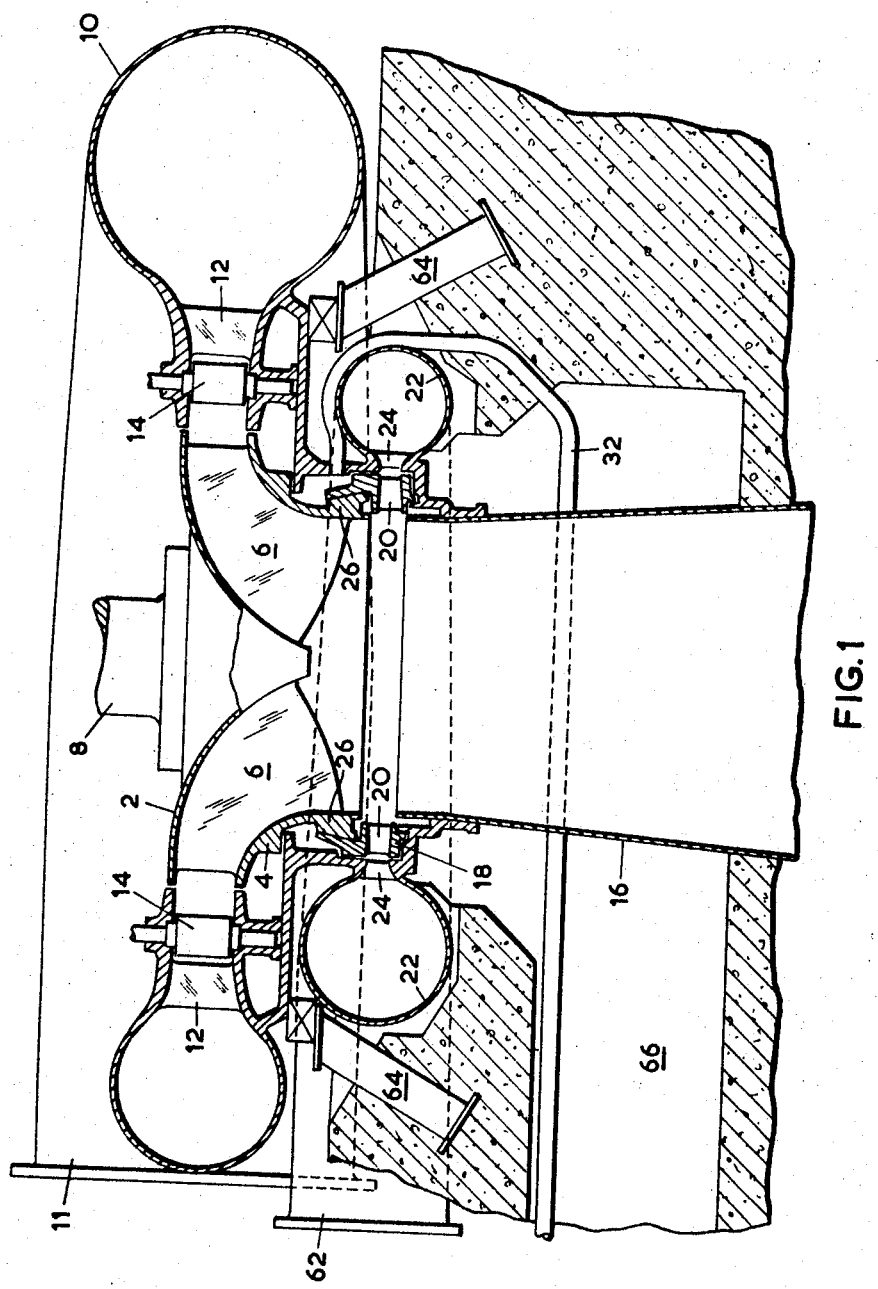
FIG. 1 is a sectional view of the pump turbine in a vertical plane.

The pump turbine is of the Francis type and has a runner consisting of a crown 2 with a skirt 4 and with interconnecting vanes 6. A vertical shaft 8 connected to the crown extends upwards to an electrical machine capable of serving either as a motor or as a generator (not shown). Around the runner there is a spiral casing 10 which has a narrowed inner portion containing fixed vanes 12 and angularly adjustable guide vanes 14. This is a conventional form of pump turbine. During operation as a turbine, water flows into the spiral casing 10 through a tangential tube 11 from a penstock extending from a high-level reservoir (not shown) and then passes through the guide vanes to the runner and is finally discharged downwards through a draft tube 16 extending to a low-level reservoir (not shown). During operation as a pump, the runner draws water up through the draft tube 16 from the low-level reservoir and discharges it into the spiral casing and finally out through the tangential tube 12 to the high-level reservoir.

The starter turbine has a runner 18 surrounding the upper end of the draft tube 16 and including vanes 20 through which water passes from a spiral casing 22 via fixed guide vanes 24. It will be seen that water powering the starter turbine discharges into the draft tube 16.

Figure 3:
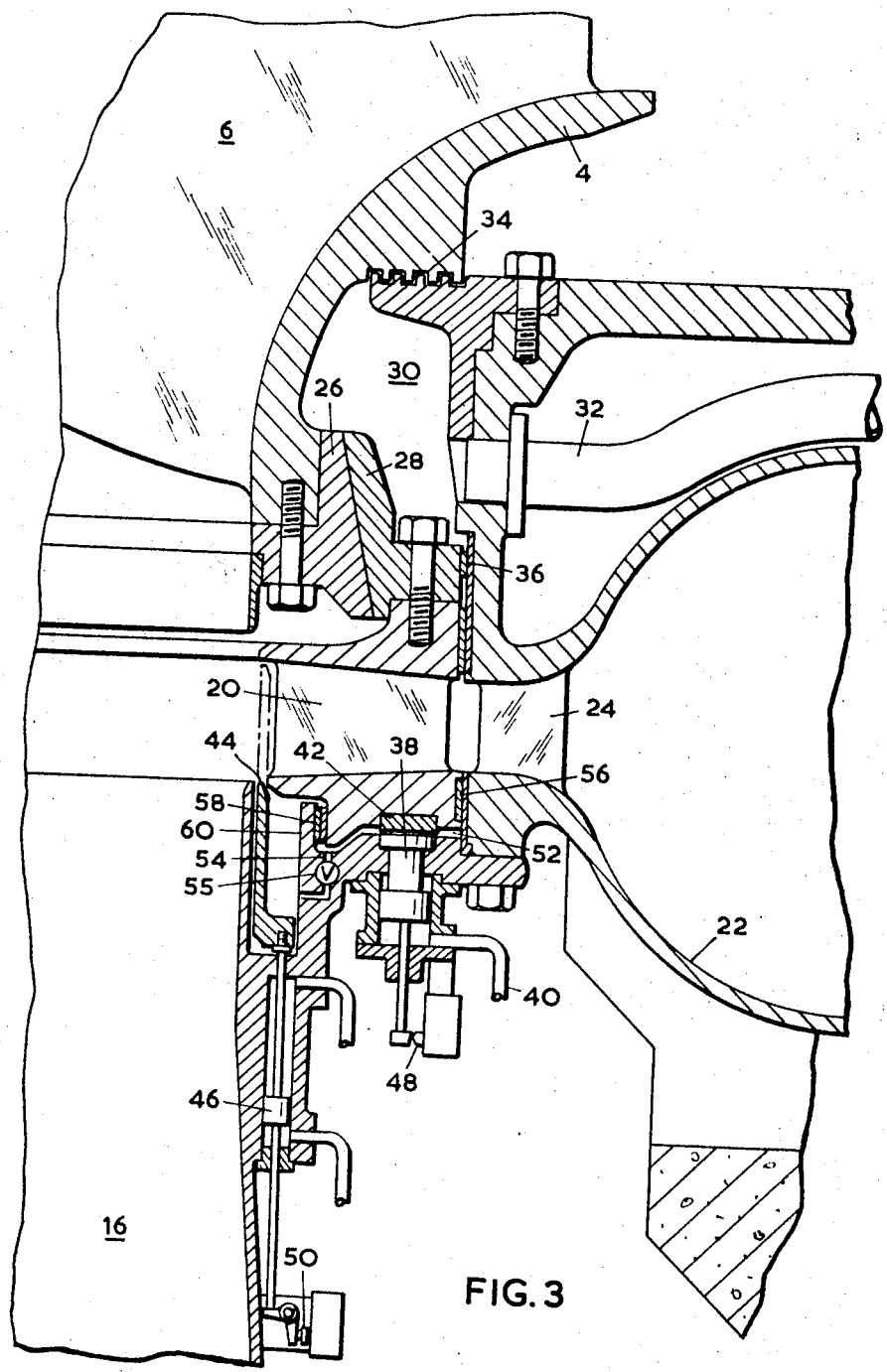
FIG. 3 is an enlarged section of part of the starter turbine as seen at the right of FIG. 1.

In order to drive the runner of the pump turbine, the runner of the starter turbine is coupled to the skirt 4 of the pump turbine during use by a frictional clutch formed by inter-engaging conical portions 26 and 28 respectively on the starter runner and main runner (see particularly FIG. 3). Downward pressure providing the necessary axial force for the driving connection of the clutch is achieved by injecting pressurised water into a chamber 30 through a pipe 32. This pressurised water may be drawn from the penstock. The pressure in the chamber 30 urges downwards the runner of the starter turbine and therefore presses the conical portion 28 firmly into the driving engagement with the conical portion 26. Seals enclosing the pressurised water in the chamber 30 are formed by a gland 34 and a sliding seal 36.

While the starter turbine is running the pump turbine runner up to speed in the pumping direction, the guide vanes 14 are kept closed to prevent water flow through the pump turbine runner. The guide vanes are opened when the runner has reached synchronous speed and is required to start pumping, whereupon the coupling between the two runners is disengaged.

When the starter turbine has run the pump turbine up to a synchronous speed in the pumping direction, the clutch is disengaged by lifting the starter turbine runner by means of pressurised fluid (drawn, for example, from the penstock) in an annular space 52 beneath the starter runner. When this lifting force is no longer required, the pressurised fluid is allowed to discharge into the draft tube through a passageway 54 controlled by a valve 55. It will be seen that fluid in the space 52 is confined by an outer sliding seal 56 and by an inner sliding seal 58 around a flange 60, the seals having relatively fine clearances. After the clutch has been disengaged, the starter runner may be held in the raised position by means of jacks 38 powered by pressurised fluid injected through pipes 40. There may in all be, for example, four jacks at regular circumferential intervals. The jacks bear on an annular pad 42 set in the runner of the starter turbine, and hold the conical portion 28 of the starter runner clear of the conical portion 26 of the main runner. Pressure must be maintained continuously in the jacks 38 to hold the clutch out of engagement.

While the starter turbine is inoperative, its runner is substantially isolated from the draft tube by an annular sleeve 44 which is lifted by jacks 46 (for example four) to the position shown in broken outline in FIG. 3.

The movement of the jacks 38 is co-ordinated by switches 48, and similar co-ordination is achieved by switches 50 in the case of the jacks 46.

The lifting force may be provided solely by the jacks 38, in which case the flange 60 can be omitted so that the space 52 communicates permanently with the draft tube. In this case there would, however, initially be rubbing at the annular pad 42 until the clutch disengages, so it is preferable to disengage the clutch by means of pressure in the space 52 and to use the jacks only after that to hold the starter runner in the raised position.

Figure 2:
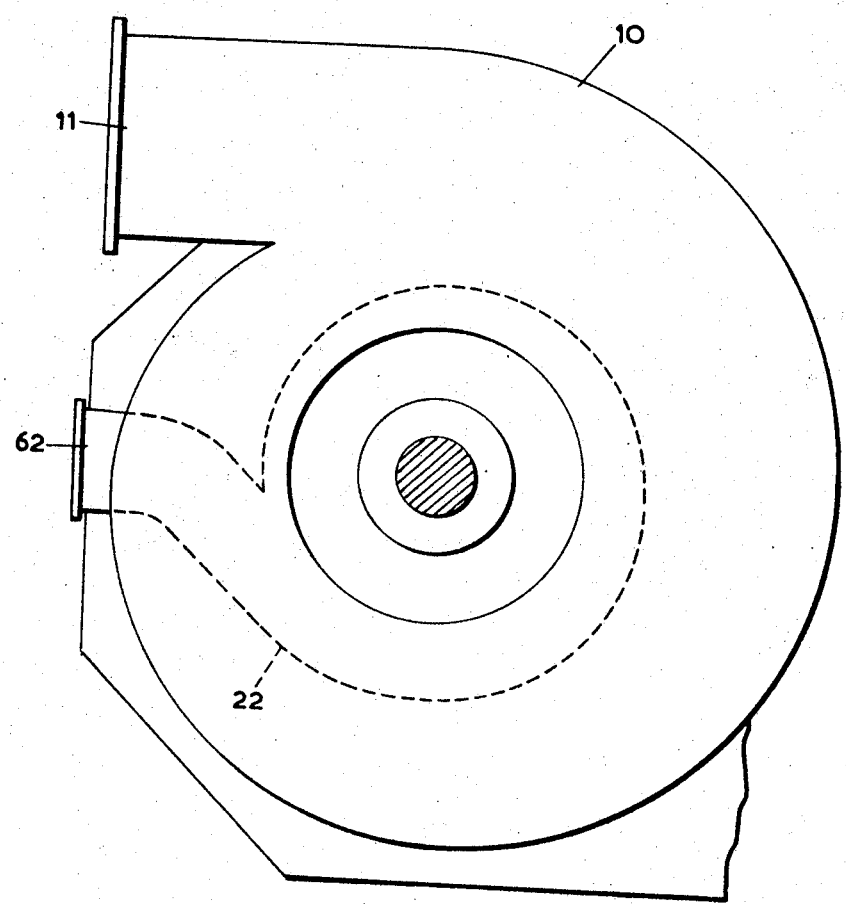
FIG. 2 is a diagrammatic plan view showing the arrangement of the spiral casings of the main pump turbine and starter turbine.

It will be seen from FIG. 2 that the spiral casing 22 of the starter turbine spirals in the opposition direction to that of the pump turbine, the reason being that the starter turbine drives in the pumping direction of the pump turbine, which is opposite to the direction in which the pump turbine runner turns when acting as a turbine. Water for powering the starter turbine passes into the spiral casing 22 through a tube 62 which may be connected through a fine control valve to the penstock of the pump turbine. The control valve enables the starter turbine to be run up exactly to the synchronous speed of the electrical motor generator.

Instead of the friction clutch being formed by the conical parts, it could be formed by engaging flat annular surfaces, in which case the axial loading would have to be appropriately increased. Alternatively a friction clutch may be formed by a number of flat annular plates connected alternately to the starter and main runners so as to give a number of frictionally engaging surfaces. A further possibility is that the clutch could be in the form of a dog coupling, or any other positive-drive coupling.

It will be seen from FIG. 1 that the supporting structure for the casing of the main pump turbine, instead of being vertical, consists of inclined parts 64 diverging in a downward direction so as to miss the spiral casing of the starter turbine.

The draft tube 16 is formed by a number of sections connected together end to end. Removal of the runner of the starter turbine may be achieved after removing a few of the sections of the draft tube through an access passageway 66. One section of the draft tube may be aligned with the access passageway and may be in two parts to facilitate removal, and the section of the draft tube above the access passageway may be in one piece, the access passageway being wide enough to allow this top section of the draft tube to be removed in one piece.

A control mechanism may be included to lower the runner of the starter turbine automatically in the event of the main runner overspeeding. The starter turbine runner would then act as a safety brake.

In common with many installations, the main runner may be run up to speed by the starter turbine while in air. Alternatively a starter turbine according to this invention may be powerful enough to run up the main runner while still in water; this would save the need for depressing the level of the water by means of compressed air, which would constitute a saving in the expense of the auxiliary equipment.

This invention is primarily intended for a pump turbine and that is why it has been described in terms of a pump turbine, but it is also applicable to a pure pump which is intended to be driven by a synchronous electric motor.

We claim:
1. A pump or reversible pump turbine having a main runner, a draft tube arranged coaxially with the main runner and a starter motor by which the main runner can be run up to synchronous speed in the pumping direction, characterized in that the starter motor is in the form of an hydraulic turbine having a starter runner arranged coaxially with the main runner around the draft tube of the pump or pump turbine to discharge inwards into the draft tube, a clutch being provided between the starter runner and said main runner, and means being provided for moving the starter runner axially between a position in which said clutch couples it to the main runner, and a position in which it is disengaged from the main runner so that it can remain stationary while the main runner is operating with a pumping action at synchronous speed.

2. A machine according to claim 1 in which the clutch is a friction clutch.

3. A machine according to claim 2 in which the clutch comprises two engaging frusto-conical surfaces, one surface being associated with the starter runner, and the other surface being associated with the main runner.

4. A machine according to claim 3 in which the axis of rotation is vertical, the started runner being below the main runner and in which the means for moving the starter runner includes first means for supplying pressurized fluid to a chamber above the cone clutch to urge the starter runner downwards during starting so that its said one frusto-conical surface frictionally engages the said other frusto-conical surface of the main runner.

5. A machine accordring to claim 4 including second means for supplying pressurized fluid to a chamber below the starter runner so as to lift the latter and thus disengage the frusto-conical surfaces of the clutch when necessary.

6. A machine according to claim 5 including jacks for holding the starter runner in the raised position so long as the clutch is required to remain disengaged.

7. A machine according to claim 1 including an axially movable sleeve which can be set selectively in one of two positions, in one of which it lies within the starter runner and substantially isolates the starter runner from the draft tube, and in the other of which it is axially spaced from the first position and is clear of the starter runner.

8. A machine according to claim 7 in which a number of jacks are provided to control the movement of the sleeve between its two positions.

9. A machine according to claim 1 including means responsive to the speed of the main runner arranged to engage the clutch automatically if the speed exceeds a predetermined safe value.

10. A hydraulic machine operable as a pump and including a main runner mounted for rotation about a vertical axis, and a draft tube coaxial with and extending downwards from the main runner and serving as the liquid inlet of the machine, characterized by a starter turbine having a runner which lies coaxially below the main runner and discharges during use radially into the draft tube, a friction clutch between the starter runner and the main runner, said friction clutch comprising two clutch parts with matching frusto-conical surfaces, one clutch part being carried by the starter runner and the other clutch part being carried by the main runner, and means for moving the starter runner axially between an operative position in which the matching surfaces of the clutch parts engage to form a driving connection between the two runners and an inoperative position in which said matching surfaces are disengaged.

11. A machine according to claim 10 in which the frustro-conical surfaces of the clutch parts are arranged such that disengagement is effected by lifting the starter runner, and the means for moving the starter runner includes an annular space beneath the starter runner, fluid delivery means for delivering pressurized fluid into the annular space for initially lifting the starter runner, and jack means operable to hold the starter runner in the raised position.

References Cited
UNITED STATES PATENTS 3,163,118   12/1964   Baumann _____ 103—87
3,185,440   5/1965   Hullmann et al. __ 103—207 XR ROBERT M. WALKER, *Primary Examiner.*

U.S. Cl. X.R.

103—207; 253—117; 290—52